United States Patent
Kwun

(10) Patent No.: US 9,749,948 B2
(45) Date of Patent: Aug. 29, 2017

(54) METHOD FOR REDUCING POWER CONSUMPTION OF BASE STATION IN WIRELESS COMMUNICATION SYSTEM

(71) Applicant: Samsung Electronics Co. Ltd., Suwon-si, Gyeonggi-do (KR)

(72) Inventor: Jong-Hyung Kwun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 473 days.

(21) Appl. No.: 13/949,375

(22) Filed: Jul. 24, 2013

(65) Prior Publication Data
US 2013/0310040 A1 Nov. 21, 2013

Related U.S. Application Data

(63) Continuation of application No. 12/984,957, filed on Jan. 5, 2011, now Pat. No. 8,509,135.

(30) Foreign Application Priority Data

Jan. 8, 2010 (KR) ........................ 10-2010-0001927

(51) Int. Cl.
*H04W 4/00* (2009.01)
*H04W 52/02* (2009.01)
(Continued)

(52) U.S. Cl.
CPC ... *H04W 52/0206* (2013.01); *H04W 52/0235* (2013.01); *H04W 84/045* (2013.01); *H04W 88/08* (2013.01); *Y02B 60/50* (2013.01)

(58) Field of Classification Search
CPC . H04W 52/0206; H04W 28/08; H04W 16/08; H04W 52/04; H04W 52/00;
(Continued)

(56) References Cited

U.S. PATENT DOCUMENTS 6,584,330 B1 6/2003 Ruuska
2007/0036096 A1* 2/2007 Sinivaara .......... H04W 52/0229
370/318

(Continued)

FOREIGN PATENT DOCUMENTS

CN 101541068 A 9/2009
EP 2 056 628 A1 5/2009
(Continued)

OTHER PUBLICATIONS

Schenzhen C., Dynamic Setup of HNBs for Energy Savings and Interference Reduction, 3rd Generation Partnership Project (3GPP), TechnicalSpecification Group (TSG) Radio Access Network (RAN), WORKINGROUP 3 (WG3), Mar. 31, 2008, pp. 1-6, vol. R3-080658.

*Primary Examiner* — Jung-Jen Liu
(74) *Attorney, Agent, or Firm* — Jefferson IP Law, LLP

(57) ABSTRACT

A method for performing a handover by a User Equipment (UE) in a wireless communication system is provided. The method includes detecting signaling from at least one of active lower base stations, transmitting, to an upper base station as a serving base station, a Radio Resource Control (RRC) measurement report including information on the detected signaling, and performing the handover to a target active lower base station. The target active lower base station is a base station that remains active among the active lower base stations and the UE, the active lower base stations are included in the cell coverage of the upper base station. The upper base station has cell coverage including cell coverage of the active lower base stations.

20 Claims, 6 Drawing Sheets

(51) Int. Cl.
*H04W 84/04* (2009.01)
*H04W 88/08* (2009.01)

(58) Field of Classification Search
CPC . H04W 52/02; H04W 52/0235; H04W 88/08; H04W 84/045; H04W 84/18; H04W 84/12; Y02B 60/50; H04L 47/72; H04L 12/5695; H04L 47/08
See application file for complete search history.

(56) References Cited

U.S. PATENT DOCUMENTS

| | | | | |
|---|---|---|---|---|
| 2009/0252073 | A1* | 10/2009 | Kim | H04W 52/0206 370/311 |
| 2009/0279519 | A1* | 11/2009 | Brisebois | H04W 52/242 370/338 |
| 2009/0286512 | A1* | 11/2009 | Huber | G06Q 20/1235 455/411 |
| 2009/0291690 | A1* | 11/2009 | Guvenc | H04W 16/10 455/444 |
| 2010/0002614 | A1* | 1/2010 | Subrahmanya | H04W 52/244 370/311 |
| 2010/0048237 | A1* | 2/2010 | Kishiyama | H04W 52/242 455/522 |
| 2010/0056184 | A1* | 3/2010 | Vakil | H04W 4/02 455/456.5 |
| 2010/0169498 | A1* | 7/2010 | Palanki | H04W 16/14 709/228 |
| 2011/0044284 | A1* | 2/2011 | Voltolina | H04W 24/02 370/331 |
| 2011/0170466 | A1* | 7/2011 | Kwun | H04W 52/0235 370/311 |
| 2011/0244792 | A1* | 10/2011 | Park | H04W 52/0216 455/39 |
| 2011/0244870 | A1* | 10/2011 | Lee | H04W 52/244 455/444 |
| 2012/0015657 | A1 | 1/2012 | Comsa et al. | |

FOREIGN PATENT DOCUMENTS

| | | |
|---|---|---|
| EP | 2 141 947 A1 | 1/2010 |
| JP | 10-145842 A | 5/1998 |
| JP | 2008-079103 A | 4/2008 |
| JP | 2009-159355 A | 7/2009 |
| JP | 2013-528959 A | 7/2013 |
| WO | 2008/084694 A1 | 7/2008 |

* cited by examiner

METHOD FOR REDUCING POWER CONSUMPTION OF BASE STATION IN WIRELESS COMMUNICATION SYSTEM

PRIORITY

This application is a continuation of prior application Ser. No. 12/984,957, filed on Jan. 5, 2011, which claimed the benefit under 35 U.S.C. §119 (a) of a Korean patent application filed on Jan. 8, 2010 in the Korean Intellectual Property Office and assigned Serial No. 10-2010-00001927, the entire disclosure of which is hereby incorporated by reference.

BACKGROUND OF THE INVENTION

1. Field of the Invention

The present invention relates to a method for reducing power consumption of a base station in a wireless communication system.

2. Description of the Related Art

Recently, a wireless communication system has been developed with a hierarchical cell structure in which two or more base stations are hierarchically operated. An example of such a wireless communication system is illustrated in FIG. 1.

FIG. 1 illustrates a wireless communication system with a hierarchical cell structure according to the related art.

Referring to FIG. 1, the wireless communication system includes an upper base station 100 and a lower base station 120. The upper base station 100 provides a macro cell coverage 110, including a cell coverage 130 of the lower base station 120. Further, the lower base station 120 has the cell coverage 130 corresponding to a part of the cell coverage 110 of the upper base station 100.

In the above described structure of the wireless communication system, when the traffic load in a specific area 130 within the cell coverage 110 of the upper base station 100 rapidly increases, there is an advantage in that the increased traffic can be efficiently handled without extension or relocation of base station installations based on the lower base station provided in the corresponding area 130.

In a wireless communication system, traffic load varies over time at a certain period (e.g., 24 hours, one week, and the like). That is, in a time zone in which frequent use of the wireless communication system occurs, such as a business time zone, a relatively large amount of traffic occurs with an increase of users. Contrarily, in a midnight time zone, a relatively small amount of traffic occurs.

In the wireless communication system, in order to smoothly provide service to users even in a time zone in which a traffic load is the highest, the capacity of a base station is generally set to a capacity capable of facilitating traffic handling in the time zone in which the traffic load is the highest.

Further, in a wireless communication system according to the related art, a base station performs basic operations for normally providing service even in a time zone in which the traffic load is relatively low. As an example, these basic operations include operations for system information transmission, primary/secondary synchronizing signal transmission, reference signal transmission, and the like.

As the basic operations are performed, a considerable amount of power is consumed in the base station. More specifically, assuming that the base station consumes 100% of reference power to handle maximum traffic, about 52% of the reference power may be continuously consumed to perform the basic operations in the base station.

Even when there is no traffic within the cell coverage of the base station, the base station performs the basic operations and thus continuously consumes power. More particularly, in a wireless communication system with a hierarchical cell structure, there is a problem in that a plurality of lower base stations are used and therefore power consumption of base stations within a corresponding cell further increases.

SUMMARY OF THE INVENTION

An aspect of the present invention is to address at least the above-mentioned problems and/or disadvantages and to provide at least the advantages described below. Accordingly, an aspect of the present invention is to provide a method for reducing power consumption of a base station in a wireless communication system.

Another aspect of the present invention is to provide a method for reducing power consumption of a lower base station in a wireless communication system with a hierarchical cell structure, in which the lower base station is turned on or off through communication with an upper base station according to a traffic load within a corresponding cell coverage.

In accordance with an aspect of the present invention, a method for performing a handover by a User Equipment (UE) in a wireless communication system is provided. The method includes detecting signaling from at least one of active lower base stations, transmitting, to an upper base station as a serving base station, a Radio Resource Control (RRC) measurement report including information on the detected signaling, and performing the handover to a target active lower base station, wherein each of the active lower base stations performs an activating operation by receiving a cell activation request, instructing each of the active lower base stations to perform the activating operation, from the upper base station in an energy saving mode, wherein the RRC measurement report is used to determine at least one target base station to be deactivated among the active lower base stations in the upper base station, wherein the at least one target base station to be deactivated receives a cell deactivation request, instructing the at least one target base station to be deactivated to perform a deactivating operation, from the upper base station, and performs the deactivating operation for entry back into the energy saving mode, wherein the target active lower base station is a base station that remains active among the active lower base stations, and wherein the UE and the active lower base stations are included in the cell coverage of the upper base station, and the upper base station has cell coverage including cell coverage of the active lower base stations.

In accordance with another aspect of the present invention, a method for reducing power consumption of a lower base station in a wireless communication system is provided. The method includes, receiving a cell activation request instructing to perform a turn-on operation from an upper base station in an energy saving mode, performing the turn-on operation according to the cell activation request, and upon receiving a cell deactivation request instructing to perform a turn-off operation for entry into the energy saving mode from the upper base station, performing the turn-off operation, wherein the upper base station comprises a base station that has cell coverage including cell coverage of the lower base station, and the lower base station comprises a base station included in the cell coverage of the upper base station.

In accordance with yet another aspect of the present invention, an upper base station in a wireless communication system is provided. The upper base station includes, a receiver for receiving a RRC measurement report from a UE, and a base station interface unit for transmitting a cell activation request instructing to perform a turn-on operation to lower base stations in an energy saving mode, and for transmitting a cell deactivation request instructing to perform a turn-off operation for entry into the energy saving mode to at least one turn-off target base station, determined according to the RRC measurement report, wherein the at least one turn-off target base station comprises at least one of base stations performing the turn-on operation according to the cell activation request, the upper base station comprises a base station that has cell coverage including cell coverage of the lower base stations, and the lower base stations comprise base stations included in the cell coverage of the upper base station.

In accordance with still yet another aspect of the present invention, a lower base station in a wireless communication system is provided. The lower base station includes, a base station interface unit for receiving a cell activation request instructing to perform a turn-on operation from an upper base station in an energy saving mode, and a controller for performing the turn-on operation according to the cell activation request, and for, upon receiving a cell deactivation request instructing to perform a turn-off operation for entry into the energy saving mode from the upper base station through the base station interface unit, performing the turn-off operation, wherein the upper base station comprises a base station that has cell coverage including cell coverage of the lower base station, and the lower base station comprises a base station included in the cell coverage of the upper base station.

In accordance with an aspect of the present invention, a method for reducing power consumption by a lower base station in a wireless communication system is provided. The method includes periodically monitoring a traffic load within cell coverage, transmitting a request for accommodation of a traffic within the cell coverage to an upper base station, and performing a turn-off operation, if a message representing that the accommodation of the traffic is possible is received from the upper base station, wherein the upper base station comprises a base station that has cell coverage including cell coverage of the lower base station, and the lower base station comprises a base station included in the cell coverage of the upper base station.

In accordance with an aspect of the present invention, a method for reducing power consumption by an upper base station in a wireless communication system is provided. The method includes verifying remaining available capacity, if a requesting for accommodation of a traffic within cell coverage of a lower base station is received from the lower base station, determining whether the traffic is additionally accommodated based on the remaining available capacity, and transmitting a response corresponding to the request to the lower base station according to a result of the determining, wherein the upper base station comprises a base station that has cell coverage including cell coverage of the lower base station, and the lower base station comprises a base station included in the cell coverage of the upper base station.

In accordance with still yet another aspect of the present invention, a lower base station in a wireless communication system is provided. The lower base station includes, a base station interface unit for performing communication with an upper base station, and a controller for periodically monitoring a traffic load within cell coverage, transmitting a request for accommodation of a traffic within the cell coverage to an upper base station by controlling the base station interface unit, and performing a turn-off operation, if a message representing that the accommodation of the traffic is possible is received from the upper base station, wherein the upper base station comprises a base station that has cell coverage including cell coverage of the lower base station, and the lower base station comprises a base station included in the cell coverage of the upper base station.

In accordance with still yet another aspect of the present invention, an upper base station in a wireless communication system is provided. The lower base station includes, a base station interface unit for performing communication with a lower base station, and a controller for verifying remaining available capacity, if a requesting for accommodation of a traffic within cell coverage of a lower base station is received from the lower base station, determining whether the traffic is additionally accommodated based on the remaining available capacity, and transmitting a response corresponding to the request to the lower base station, by controlling the base station interface unit, according to a result of the determining, wherein the upper base station comprises a base station that has cell coverage including cell coverage of the lower base station, and the lower base station comprises a base station included in the cell coverage of the upper base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENT

Figure 1:
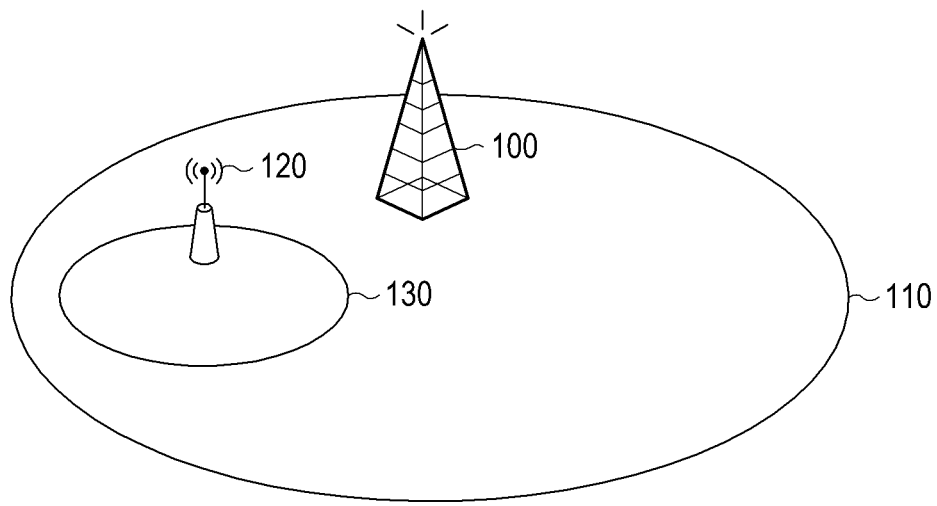
FIG. 1 illustrates a wireless communication system with a hierarchical cell structure according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method for reducing power consumption of a base station in a wireless communication system. More specifically, exemplary embodiments of the present invention provide a method for reducing power consumption of a lower base station in a wireless communication system with a hierarchical cell structure, in which the lower base station is turned on or off through communication with an upper base station according to a traffic load within its cell coverage.

A wireless communication system according to exemplary embodiments of the present invention includes a hierarchical cell structure in which, for example, a Hot Zone (HZ) base station as a lower base station is included within the cell coverage of a macro base station as an upper base station. However, it will be apparent to those skilled in the art that the wireless communication system may include a hierarchical cell structure including a macro base station and a pico base station, a macro base station and a femto base station, a macro base station and a relay base station, and the like.

The HZ base station refers to a base station that is additionally provided in the cell coverage of a macro base station in order to provide service to users in a high-capacity traffic crowded area. The HZ base station performs similar functions to the macro base station, but is characterized in that it has relatively smaller cell coverage and a relatively smaller transmission output than the macro base station.

The HZ base station may be implemented in various ways according to regional features and installation purposes. For example, the HZ base station may be provided in a building, such as a high-rise building or shopping mall, or may be provided outdoors (e.g., a campus, an amusement park, a downtown office area, and the like).

In an exemplary implementation, it will be assumed that the HZ base station is operated as follows:

When a traffic load within the cell coverage of the HZ base station is high, such as during office/business hours, the HZ base station maintains a switched-on state, and provides service to a User Equipment (UE).

When a traffic load within the cell coverage of the HZ base station is low during night or weekend/holiday, the HZ base station is turned off. Further, a UE that has been provided with service from the HZ base station is handed over to a macro base station as an upper base station to thereby be provided with continuous service.

When a traffic load within the cell coverage of the HZ base station increases according to the beginning of office/business hours, the macro base station detects an HZ base station, within the cell coverage of which an increase in traffic load is expected, from among HZ base stations maintaining a turn-off state, and turns on the detected HZ base station. The turned-on HZ base station provides service directly to a UE within its cell coverage.

The operation of the HZ base station may be roughly divided into the following two types of operations:

When a traffic load within the cell coverage of the HZ base station decreases below a threshold value, the HZ base station performs a turn-off operation in order to reduce power consumption.

When a traffic load within its cell coverage increases above the threshold value, the turned-off HZ base station performs a turn-on operation.

The turn-off operation represents an operation of stopping power supply to constituent units (e.g., transceiver for wireless communication) other than a constituent unit (e.g., an X2 interface unit, an S1 interface unit, or a backhaul unit) for communication with a macro base station. Also, the turn-on operation represents an operation of resuming power supply to the constituent units to which power supply has been stopped.

Accordingly, the HZ base station may advantageously reduce unnecessary power consumption through the turn-off operation, and provide service to a UE within its cell coverage by transmitting all signals according to wireless communication to the UE.

Hereinafter, a wireless communication system where an HZ base station performs the above two types of operations will be described in detail with reference to FIGS. 2A and 2B.

Figure 2A:
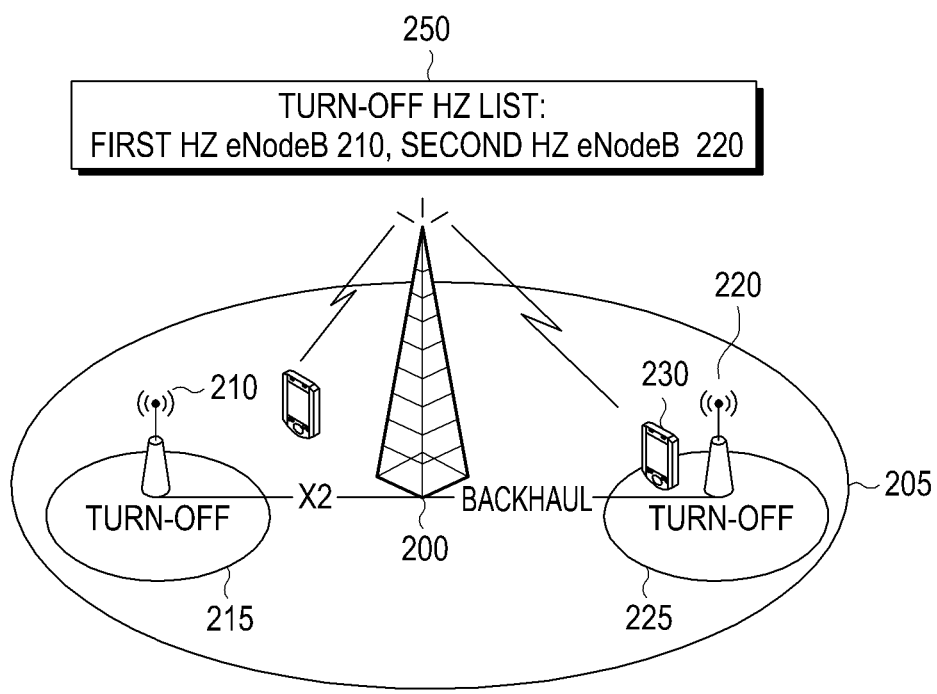
FIG. 2A illustrates a wireless communication system with a hierarchical cell structure in which a Hot Zone (HZ) base station performs a turn-off operation according to an exemplary embodiment of the present invention.

FIG. 2A illustrates a wireless communication system with a hierarchical cell structure, in which an HZ base station performs a turn-off operation according to an exemplary embodiment of the present invention.

Referring to FIG. 2A, the wireless communication system includes a macro eNodeB 200, a first HZ eNodeB 210, and a second HZ eNodeB 220.

The macro eNodeB 200 is connected to the first HZ eNodeB 210 and the second HZ eNodeB 220 through an eNodeB interface, such as an X2 interface, an S1 interface, or a backhaul unit. For convenience, a description will be given below of an example where the macro eNodeB 200 is connected to the first HZ eNodeB 210 and the second HZ eNodeB 220 through the backhaul unit.

The macro eNodeB 200 may exchange a backhaul message and the like with the first HZ eNodeB 210 and the second HZ eNodeB 220 by wire through the backhaul unit.

The first HZ eNodeB 210 and the second HZ eNodeB 220 communicate with the macro eNodeB 200, and perform a turn-on or turn-off operation. Further, even when the first HZ eNodeB 210 and the second HZ eNodeB 220 are turned off, an interface enabling the first HZ eNodeB 210 and the second HZ eNodeB 220 to communicate with the macro eNodeB 200, for example, a backhaul interface, is maintained turned on.

In FIG. 2A, the first HZ eNodeB 210 detects that there is no UE within its cell coverage 215, and performs the turn-off operation. Further, if the traffic load within the cell coverage 225 of the second HZ eNodeB 220 is lower than a threshold value, then the second HZ eNodeB 220 also performs the turn-off operation, even when there is a UE 230 within its cell coverage 225. In this case, as the second HZ eNodeB 220 is turned off, the UE 230 within the cell coverage 225 performs a handover to the macro eNodeB 200, and thus is provided with service from the macro eNodeB 200.

The macro eNodeB 200 stores and manages a list of HZ eNodeBs turned off within its cell coverage 205, that is, a turn-off HZ list 205. For example, FIG. 2A illustrates that the macro eNodeB 200 stores and manages the first HZ eNodeB 210 and the second HZ eNodeB 220 in the turn-off HZ list 250.

Figure 2B:
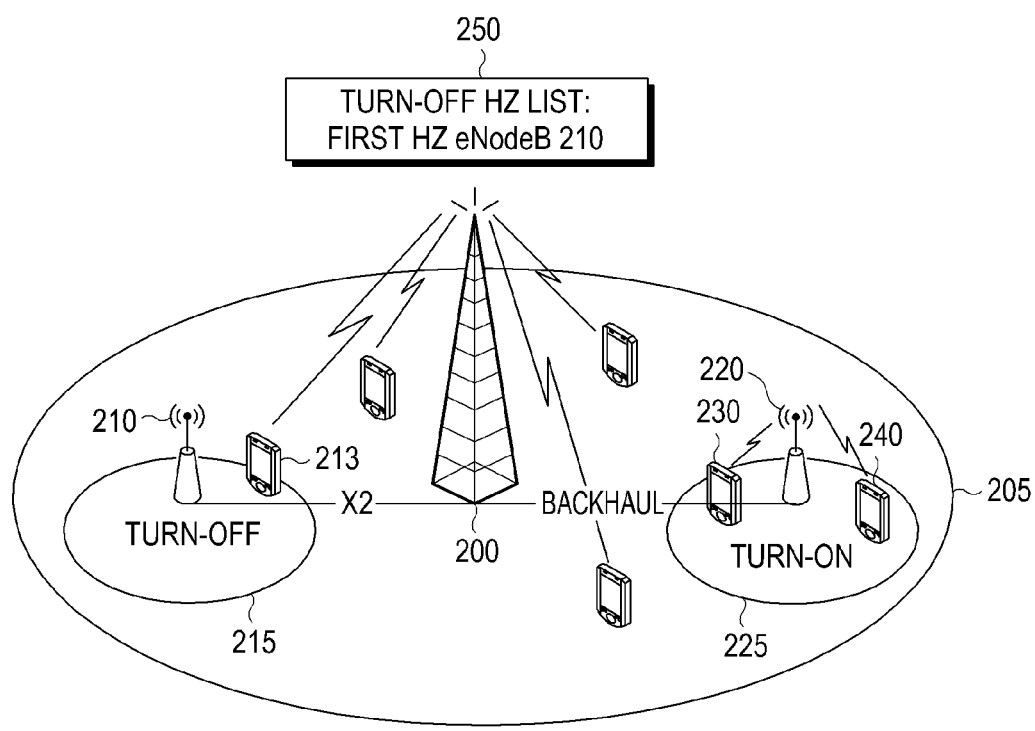
FIG. 2B illustrates a wireless communication system with a hierarchical cell structure, in which an HZ base station performs a turn-on operation according to an exemplary embodiment of the present invention.

After the first HZ eNodeB 210 and the second HZ eNodeB 220 are turned off as illustrated in FIG. 2A, the first HZ eNodeB 210 and the second HZ eNodeB 220 may be turned on as illustrated in FIG. 2B.

FIG. 2B illustrates a wireless communication system with a hierarchical cell structure, in which an HZ base station performs a turn-on operation according to an exemplary embodiment of the present invention. The wireless communication system of FIG. 2B has the same structure as that of FIG. 2A.

Referring to FIG. 2B, in the state where the first HZ eNodeB 210 and the second HZ eNodeB 220 are turned off as illustrated in FIG. 2A, each of the first HZ eNodeB 210 and the second HZ eNodeB 220 verifies a traffic load within its cell coverage 215, 225. Further, according to the verified traffic load, each of the first HZ eNodeB 210 and the second HZ eNodeB 220 determines if it performs the turn-on operation.

For example, when the traffic load verified in the state of FIG. 2A is determined to be lower than the threshold value, the first HZ eNodeB 210 maintains the turn-off state, even when there is a UE 213 within its cell coverage 215. Accordingly, the UE 213 is provided with service from the macro eNodeB 200.

When the verified traffic load is determined to be higher than the threshold value because the number of UEs within the cell coverage 225 of the second HZ eNodeB 220 increases as compared to the state of FIG. 2A, the second HZ eNodeB 220 performs the turn-on operation. Further, after the second HZ eNodeB 220 is turned on, it provides service directly to the UEs 230, 240 within its cell coverage 225.

When the traffic load within the cell coverage 215 of the first HZ eNodeB 210 increases, the first HZ eNodeB 210 may also perform the turn-on operation, and provide service directly to UEs within its cell coverage 215.

As the second HZ eNodeB 220 performs the turn-on operation, the macro eNodeB 200 deletes data of the second HZ eNodeB 220 from the turn-off HZ list 250. Accordingly, only data of the first HZ eNodeB 210 is stored in the turn-off HZ list 250.

Figure 3:
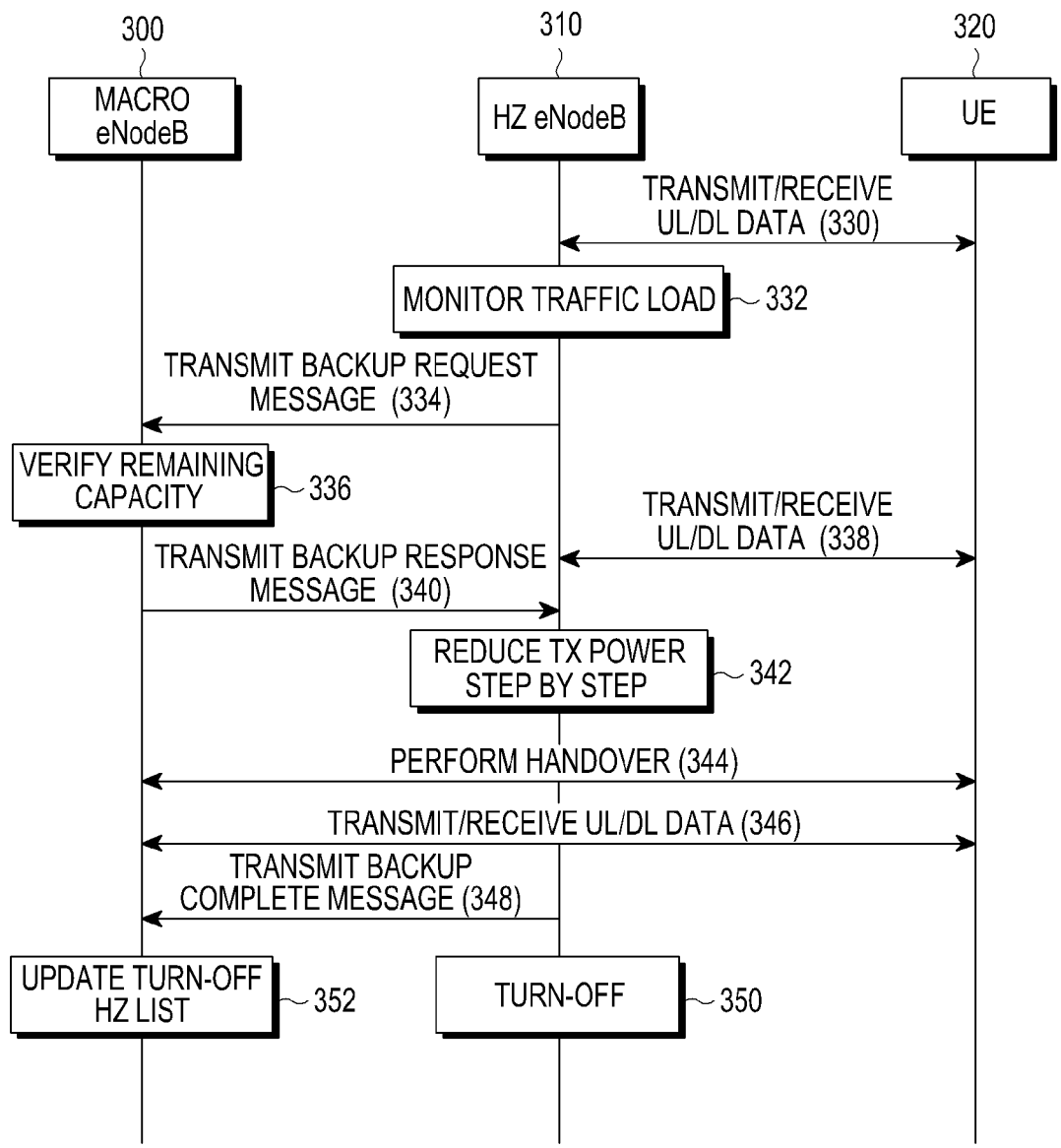
FIG. 3 is a signal flow diagram for a turn-off operation of an HZ base station in a wireless communication system with a hierarchical cell structure according to an exemplary embodiment of the present invention.

Next, reference will be made to FIG. 3 illustrating a turn-off operation of an HZ base station in a wireless communication system with a hierarchical cell structure according to an exemplary embodiment of the present invention.

FIG. 3 is a signal flow diagram for a turn-off operation of an HZ base station in a wireless communication system with a hierarchical cell structure according to an exemplary embodiment of the present invention.

The signal flow occurs between a macro eNodeB 300, an HZ eNodeB 310, and a UE 320. The macro eNodeB 300, the HZ eNodeB 310, and the UE 320 correspond to the macro eNodeB 200, the second HZ eNodeB 220, and the UE 230, respectively, in FIG. 2A.

In step 330, the HZ eNodeB 310 transmits and receives UpLink (UL) and DownLink (DL) data to and from the UE 320 within its cell coverage. In step 332, the HZ eNodeB 310 periodically monitors if a traffic load within its cell coverage is below a threshold value for a preset period of time. For example, the HZ eNodeB 310 monitors if a total sum of resource blocks allocated to intra-cell users within a certain recent period of time is below a threshold value.

When, as a result of the monitoring, the monitored traffic load is below the threshold value for the preset period of time, in step 334, the HZ eNodeB 310 transmits a backup request message to the macro eNodeB 300.

The backup request message includes traffic load information within the cell coverage of the HZ eNodeB 310, and the traffic load information may include, for example, resource allocation information, such as a sum of allocated bandwidths, a sum of allocated subcarriers, or a sum of allocated resource blocks.

The HZ eNodeB 310 may acquire information, which indicates that the macro eNodeB 300 is its upper base station, from an eNodeB management entity controlling all eNodeBs, for example, an Operation, Administration, and Maintenance (OA&M) server. Alternatively, based on frequency statistics information for handover preparation target base stations, the HZ eNodeB 310 may determine a base station with the highest frequency as an upper base station, the cell coverage of which overlays its cell coverage.

Upon receiving the backup request message, in step 336, the macro eNodeB 300 verifies its remaining available capacity, and then determines if the remaining available capacity may additionally accommodate traffic within the cell coverage of the HZ eNodeB 310. While step 366 is performed, the HZ eNodeB 310 and the UE 320 transmit and receive UL and DL data in step 338.

When the macro eNodeB 300 determines that its remaining available capacity may additionally accommodate traffic within the cell coverage of the HZ eNodeB 310, the macro eNodeB 300 proceeds to step 340, and transmits a backup response message to the HZ eNodeB 310.

Contrarily, when the macro eNodeB 300 determines that its remaining available capacity cannot additionally accommodate traffic within the cell coverage of the HZ eNodeB 310, it transmits a backup failure message to the HZ eNodeB 310 although not illustrated in FIG. 3.

When the HZ eNodeB 310 receives the backup failure message, it does not transmit a backup request message to the macro eNodeB 300 for a preset back-off time (Tback-_off_switch_OFF).

However, when the HZ eNodeB 310 receives the backup response message, in step 342, it reduces Transmit (TX) power step by step over time. The backup response message includes information indicating whether the HZ eNodeB 310 is to perform the turn-off operation, information on the amount of power reduction over time (i.e., $\Delta$Preduction), time interval information indicating a time interval in which TX power is to be reduced, and the like.

Thereupon, the HZ eNodeB 310 determines that it should perform the turn-off operation, based on the information included in the backup response message, and may reduce TX power by ΔPreduction at each unit time according to the time interval information.

If the HZ eNodeB 310 reduces TX power, then the UE 320 detects that the strength of a signal received from the HZ eNodeB 310 is lowered, and thus determines that it should perform a handover to the macro eNodeB 300. Accordingly, in step 344, the UE 320 performs a handover from the HZ eNodeB 310 to the macro eNodeB 300.

In an exemplary implementation, the UE may be forcibly handed over to the macro eNodeB 300 by the HZ eNodeB 310. In this case, reducing TX power of the HZ eNodeB 310 step by step may be omitted.

Upon completion of the handover in step 344, the macro eNodeB 300 and the UE 320 transmits and receives UL and DL data in step 346. That is, the UE 320 is provided with service from the macro eNodeB 300.

When the time interval where TX power is reduced arrives at its last point (Preduction_min), the HZ eNodeB 310 transmits a backup complete message to the macro eNodeB 300 in step 348.

If there is another UE that has not performed a handover to the macro eNodeB 300, the HZ eNodeB 310 performs an operation of handing over the UE to the macro eNodeB 300.

Further, when step 330 to step 348 are completed, the HZ eNodeB 310 performs the turn-off operation in step 350.

Upon receiving the backup complete message from the HZ eNodeB 310 in step 350, the macro eNodeB 300 updates a turn-off HZ list by adding the ID of the HZ eNodeB 310 to the turn-off HZ list in step 352.

Through the turn-off operation as described above, the HZ eNodeB 310 may conveniently prevent power from being unnecessarily consumed when the traffic load is low, and thus prevent a waste of power.

Figure 4:
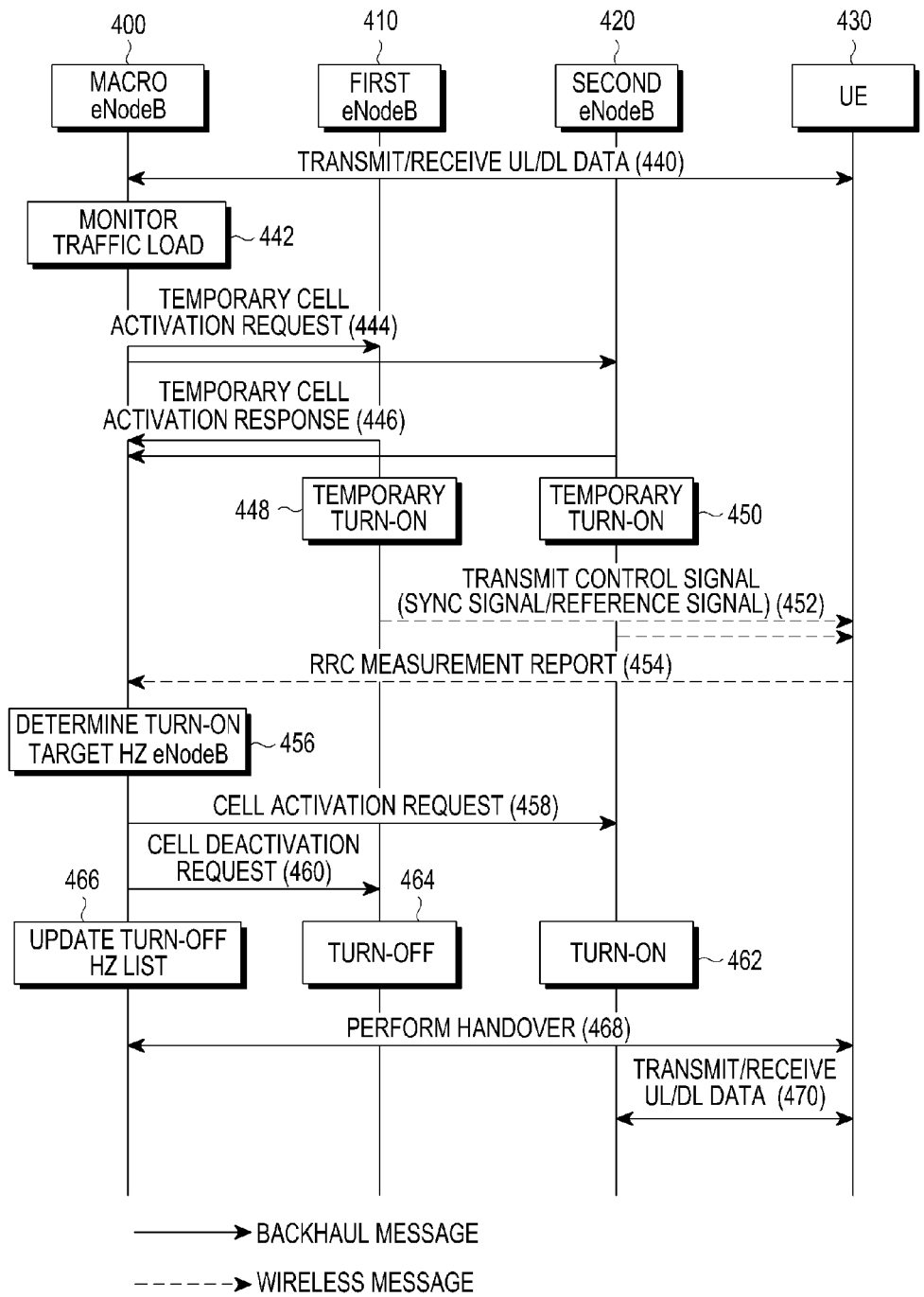
FIG. 4 is a signal flow diagram for a turn-on operation of an HZ base station in a wireless communication system with a hierarchical cell structure according to an exemplary embodiment of the present invention.

Reference will now be made to FIG. 4 illustrating a turn-on operation of an HZ base station in a wireless communication system with a hierarchical cell structure according to an exemplary embodiment of the present invention.

FIG. 4 is a signal flow diagram for a turn-on operation of an HZ base station in a wireless communication system with a hierarchical cell structure according to an exemplary embodiment of the present invention.

The signal flow occurs between a macro eNodeB 400, a first HZ eNodeB 410, a second HZ eNodeB 420, and a UE 430. The macro eNodeB 400, the first HZ eNodeB 410, the second HZ eNodeB 420, and the UE 430 correspond to the macro eNodeB 200, the first HZ eNodeB 210, the second HZ eNodeB 220, and the UE 230, respectively, in FIG. 2B.

Further, the procedure of FIG. 4 may be performed following the turn-off operation of FIG. 3. For example, the procedure of FIG. 4 may be performed when both the first HZ eNodeB 410 and the second HZ eNodeB 420 are turned off and the second HZ eNodeB 420 is to be provided with service from the macro eNodeB 400.

Referring to FIG. 4, in step 440, the macro eNodeB 400 transmits and receives UL and DL data to and from the UE 430 within the cell coverage of the second HZ eNodeB 420 that has entered an energy saving according to its turn-off state. That is, the macro eNodeB 400 provides service to the UE 430.

In step 442, the macro eNodeB 400 periodically monitors a traffic load within its cell coverage while providing service to the UE 430. For example, the macro eNodeB 400 monitors if a total sum of resource blocks allocated to intra-cell users within a certain recent period of time is above a threshold value.

When the traffic load within the cell coverage of the macro eNodeB 400 is above the threshold value for a preset period of time, in step 444, the macro eNodeB 400 transmits a temporary cell activation request for a temporary turn-on operation to HZ eNodeBs stored in a turn-off HZ list, that is, the first HZ eNodeB 410 and the second HZ eNodeB 420. The temporary cell activation requesting transmission in step 444 is performed in order to select an eNodeB to which to distribute traffic within its cell coverage, from among the first HZ eNodeB 410 and the second HZ eNodeB 420.

The temporary cell activation request is used to instruct the first HZ eNodeB 410 and the second HZ eNodeB 420, which are in a turn-off state within the cell coverage of the macro eNodeB 400, to perform a temporary turn-on operation corresponding to a turn-on operation for a preset period of time.

Upon receiving the temporary cell activation request, in step 446, the first HZ eNodeB 410 and the second HZ eNodeB 420 transmit a temporary cell activation response to the macro eNodeB 400. When the temporary turn-on operation is impossible, the first HZ eNodeB 410 and the second HZ eNodeB 420 transmit a temporary cell activation failure message to the macro eNodeB 400. Then, the macro eNodeB 400 excludes the HZ eNodeBs, which have transmitted the temporary cell activation failure message, from turn-on target eNodeBs to which to distribute traffic.

After the first HZ eNodeB 410 and the second HZ eNodeB 420 transmit the temporary cell activation response, the first HZ eNodeB 410 and the second HZ eNodeB 420 perform the temporary turn-on operation according to parameters defined in the temporary cell activation request in steps 448 and 450.

The temporary cell activation request includes time interval information indicating a time interval in which the temporary turn-on operation is to be performed and TX power information. Accordingly, the first HZ eNodeB 410 and the second HZ eNodeB 420 perform the temporary turn-on operation for a time interval according to the time interval information by using TX power according to the TX power information.

The time when each HZ eNodeB performs the temporary turn-on operation may be the same or different. Further, during the temporary turn-on operation, the first HZ eNodeB 410 and the second HZ eNodeB 420 may transmit a control signal including a synchronizing signal or a reference signal, such as a pilot signal, to the UE 430 over a control channel respectively, in step 452.

Based on the control signals received from the first HZ eNodeB 410 and the second HZ eNodeB 420, the UE 430 identifies the HZ eNodeB located nearest thereto. More specifically, the UE 430 measures the strengths of the control signals received from the first HZ eNodeB 410 and the second HZ eNodeB 420, that is, Reference Signal Received Power (RSRP) levels. The UE 430 identifies an eNodeB, which corresponds to a higher RSRP level among the first HZ eNodeB 410 and the second HZ eNodeB 420, as the HZ eNodeB nearest thereto.

In FIG. 4, since the UE 430 is within the cell coverage of the second HZ eNodeB 420, the second HZ eNodeB 420 is identified as the eNodeB nearest to the UE 430.

In step 454, the UE 430 transmits a Radio Resource Control (RRC) measurement report including information on the identified HZ eNodeB, for example, the ID of the second HZ eNodeB 420 and the previously measured RSRP level information, to the macro eNodeB 400.

Then, based on the RRC measurement report transmitted by the UE 430, the macro eNodeB 400 determines a turn-on target HZ eNodeB in step 456. In determining the turn-on target eNodeB, the macro eNodeB 400 may additionally use the number of UEs according to turn-on candidate HZ eNodeBs and Quality of Service (QoS) requirement information, as well as the RRC measurement report.

The macro eNodeB 400 compares the ID of the HZ eNodeB included in the RRC measurement report with IDs of HZ eNodeBs stored in the turn-off HZ list to thereby determine the cell coverage of which eNodeB the UE 430 is located. Further, the macro eNodeB 400 predicts the wireless environment of the corresponding HZ eNodeB, based on the RSRP level information.

The macro eNodeB 400 transmits a cell activation request instructing to perform the turn-on operation to the turn-on target eNodeB in an energy saving mode, that is, the second HZ eNodeB 420 in step 458, and transmits a cell deactivation request instructing to perform the turn-off operation for entry into the energy saving mode to the other candidate HZ eNodeB, that is, the first HZ eNodeB 410 in step 460.

Upon receiving the cell activation request, the second HZ eNodeB 420 performs the turn-on operation and thus normal eNodeB operations in step 462. Upon receiving the cell deactivation request, the first HZ eNodeB 410 terminates the temporary turn-on operation and performs the turn-off operation in step 464.

Further, in step 466, the macro eNodeB 400 updates the turn-off HZ list by deleting the ID of the second HZ eNodeB 420 from the list.

In step 468, the UE 430 performs a handover from the macro eNodeB 400 to the turned-on second HZ eNodeB 420. This handover may be initialized by the macro eNodeB 400 or the turned-on second HZ eNodeB 420, based on the RRC measurement report made in step 454.

Upon completion of the handover, the UE 430 transmits and receives UL and DL data to and from the second HZ eNodeB 420 in step 470. Accordingly, the UE 430 is provided with service from the second HZ eNodeB 420.

In FIG. 4, messages transmitted through a backhaul are designated by solid lines, and messages transmitted through wireless communication are designated by dotted lines. That is, communication via a backhaul interface is performed between the macro eNodeB 400 and the first HZ eNodeB 410 and the second HZ eNodeB 420, and wireless communication via a wireless interface is performed between the macro eNodeB 400 and the UE 430 and between the first HZ eNodeB 410 and the second HZ eNodeB 420 and the UE 430.

Figure 5:
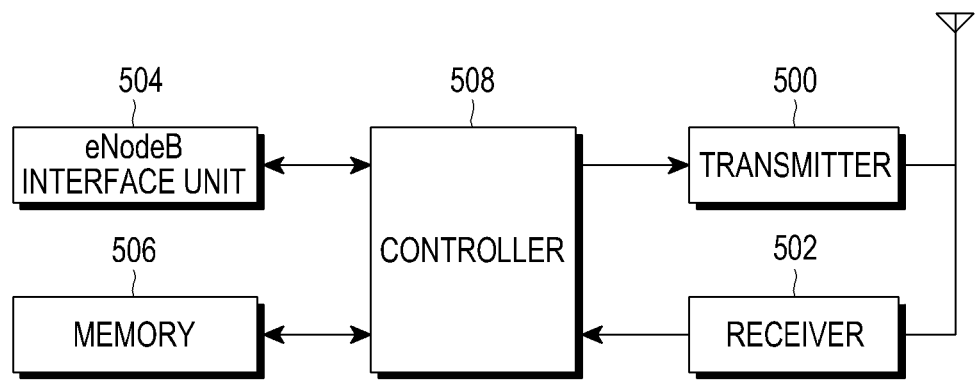
FIG. 5 is a block diagram illustrating a structure of a macro base station according to an exemplary embodiment of the present invention.

Next, reference will be made to FIG. 5 illustrating a structure of a macro base station according to an exemplary embodiment of the present invention.

FIG. 5 is a block diagram illustrating a structure of a macro base station according to an exemplary embodiment of the present invention.

Referring to FIG. 5, the macro eNodeB includes a transmitter 500, a receiver 502, an eNodeB interface unit 504, a memory 506, and a controller 508.

The transmitter 500 transmits DL data to a UE. The receiver 502 receives UL data transmitted from the UE.

The eNodeB interface unit 504 provides an interface for communication with HZ eNodeBs existing within the cell coverage of the macro eNodeB.

The memory 506 stores a turn-off HZ list that is a list of turned-off HZ eNodeBs within the cell coverage of the macro eNodeB.

The controller 508 controls the transmitter 500, the receiver 502, the eNodeB interface unit 504, and the memory 506, and controls the overall operation of the macro eNodeB.

Upon receiving a backup request message from an HZ eNodeB, the controller 508 verifies its remaining available capacity and determines if the remaining available capacity may accommodate traffic within the cell coverage of the HZ eNodeB, based on traffic load information included in the backup request message.

When the remaining available capacity is determined to be able to accommodate the traffic within the cell coverage of the HZ eNodeB, the controller 508 transmits a backup response message to the HZ eNodeB. However, when the remaining available capacity is determined to be unable to accommodate the traffic within the cell coverage of the HZ eNodeB, the controller 508 transmits a backup failure message to the HZ eNodeB.

When the HZ eNodeB or a UE located within the cell coverage of the HZ eNodeB requests the macro eNodeB for a handover, the controller 508 performs the handover, and then provides service to the UE. Upon receiving a backup complete message from the HZ eNodeB, the controller 508 determines that the HZ eNodeB is turned off, and updates a turn-off HZ list stored in the memory 506. That is, the controller deletes the ID of the corresponding HZ eNodeB from a turn-off HZ list stored in the memory 506.

In a state where all HZ eNodeBs within the cell coverage of the macro eNodeB are turned off, the controller 508 may provide service to UEs located within the cell coverage of the HZ eNodeBs. In this state, the controller 508 periodically monitors traffic load within the cell coverage of the macro eNodeB.

When traffic load within the cell coverage of the macro eNodeB is above a threshold value for a preset period of time, the controller 508 transmits a cell activation request instructing to perform a turn-on operation to HZ eNodeBs stored in the turn-off HZ list. Further, the controller receives a temporary cell activation response message or a temporary cell activation failure message from the HZ eNodeBs. Here, the controller 508 excludes HZ eNodeBs, which have transmitted the temporary cell activation failure message, from turn-on target eNodeBs to which to distribute traffic.

Upon receiving an RRC measurement report from a UE located within the cell coverage of one of HZ eNodeBs that have transmitted the temporary cell activation response message, the controller determines a turn-on target HZ eNodeB, based on the received RRC measurement report.

The controller 508 transmits a cell activation request to the determined turn-on target HZ eNodeB, and transmits a cell deactivation request to the other HZ eNodeBs. Then, the controller 508 updates the turn-off HZ list by deleting the ID of the determined turn-on target HZ eNodeB from the turn-off HZ list.

Subsequently, the controller 508 performs a handover process so that the UE that has transmitted the RRC measurement report may hand over to the determined turn-on target HZ eNodeB. Here, the handover process may be initialized by the controller 508 or the determined turn-on target HZ eNodeB, based on the RRC measurement report.

Figure 6:
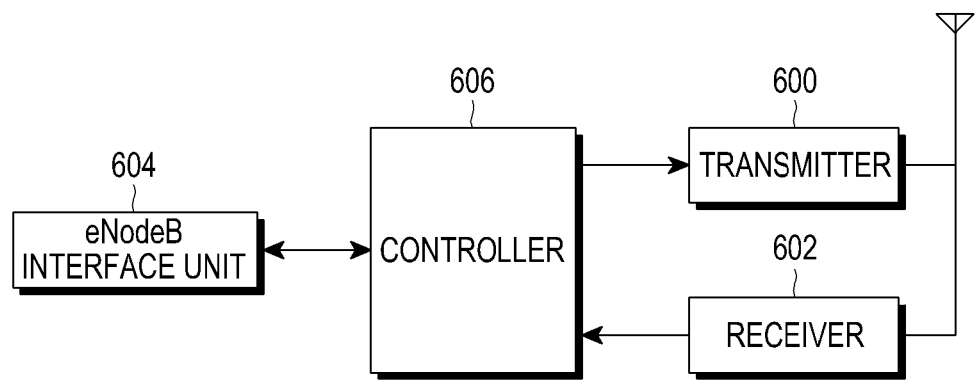
FIG. 6 is a block diagram illustrating a structure of an HZ base station according to an exemplary embodiment of the present invention.

Next, reference will be made to FIG. 6 illustrating a structure of an HZ base station according to an exemplary embodiment of the present invention.

FIG. 6 is a block diagram illustrating a structure of an HZ base station according to an exemplary embodiment of the present invention.

Referring to FIG. 6, the HZ eNodeB includes a transmitter 600, a receiver 602, an eNodeB interface unit 604, and a controller 606.

The transmitter 600 transmits DL data including a control signal to a UE, and the receiver 602 receives UL data transmitted by the UE.

The eNodeB interface unit 604 provides an interface for communication with a macro eNodeB, the cell coverage of which includes the cell coverage of the HZ eNodeB.

The controller 606 controls the transmitter 600, the receiver 602, and the eNodeB interface unit 604, and controls the overall operation of the HZ eNodeB.

The controller 606 transmits and receives UL and DL data to and from a UE located within the cell coverage of the HZ eNodeB. Further, the controller 606 periodically monitors if traffic load within the cell coverage of the HZ eNodeB is below a threshold value for a preset period of time. When the traffic load is below the threshold value for the preset period of time, the controller 606 transmits a backup request message to the macro eNodeB.

Upon receiving a backup failure message from the macro eNodeB, the controller 606 does not transmit a backup request message to the macro eNodeB for a preset back-off period of time.

Further, upon receiving a backup response message from the macro eNodeB, the controller 606 reduces TX power by a power reduction amount according to power reduction amount information at each unit time according to time interval information, based on the power reduction amount information and the time interval information included in the backup response message.

When TX power is reduced as described above, the UE performs a handover to the macro eNodeB. Accordingly, the controller 606 performs an operation for allowing the UE to hand over to the macro eNodeB.

When the time interval where TX power is reduced arrives at its last point, the controller 606 transmits a backup complete message to the macro eNodeB. At this time, if there is another UE that has not performed a handover to the macro eNodeB, the controller 606 performs an operation for allowing the UE to hand over to the macro eNodeB.

Further, after all the above operations are completed, the controller 606 performs a turn-off operation.

In the turn-off state, upon receiving a temporary cell activation request from the macro eNodeB, the controller 606 transmits a temporary cell activation response to the macro eNodeB. Further, the controller 606 performs a temporary cell activation operation according to parameters defined in the temporary cell activation request.

The temporary cell activation request includes time interval information indicating a time interval where the temporary cell activation operation is to be performed and TX power information. Accordingly, the controller 606 performs the temporary cell activation operation for the time interval according to the time interval information by using the TX power according to the TX power information.

When the temporary cell activation operation is impossible, the controller 606 transmits a temporary cell activation failure message to the macro eNodeB. During the temporary cell activation operation, the controller 606 transmits a control signal including a synchronizing signal or a reference signal, such as a pilot signal, to the UE over a control channel.

Upon receiving a cell activation request from the macro eNodeB, the controller 606 performs a turn-on operation to perform normal eNodeB operations. Contrarily, upon receiving a cell deactivation request from the macro eNodeB, the controller 606 performs a turn-off operation.

When the controller 606 performs the turn-on operation, it performs an operation for allowing the UE to hand over from the macro eNodeB to the HZ eNodeB. This handover process may be initialized by the macro eNodeB or the turned-on controller 606, based on an RRC measurement report transmitted from the UE.

Upon completion of the handover process, the controller 606 transmits and receives UL and DL data to and from the UE. That is, the controller 606 provides service to the UE.

Hereinafter, a procedure for transitions between operation modes of an HZ eNodeB will be described below with reference to FIG. 7.

Figure 7:
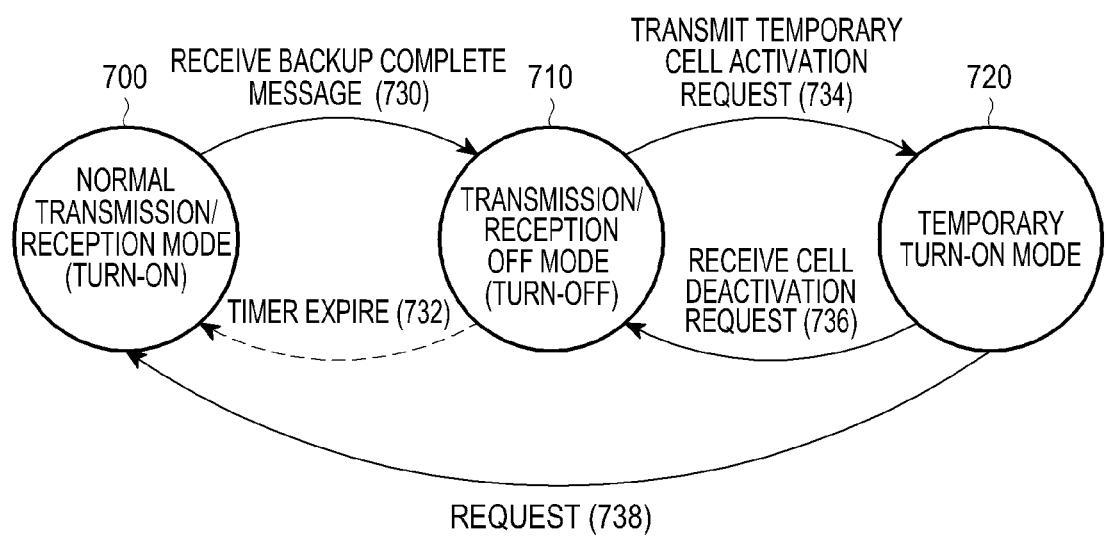
FIG. 7 illustrates transitions between operation modes of an HZ base station according to an exemplary embodiment of the present invention.

FIG. 7 illustrates transitions between operation modes of an HZ base station (i.e., an eNodeB) according to an exemplary embodiment of the present invention.

The HZ eNodeB may operate in one of three operation modes. The three operation modes include a normal transmission/reception mode 700 in which the HZ eNodeB is turned on and able to transmit and receive a signal to and from a UE, transmission/reception off mode 710 in which the HZ eNodeB is turned off and unable to transmit and receive a signal to and from a UE, and a temporary turn-on mode 720 in which the HZ eNodeB is able to temporarily transmit a signal to a UE.

As described above, the HZ eNodeB repeats a transition between the operation modes according to turn-on and turn-off operations.

More specifically, if the HZ eNodeB, which is turned on and operates in the normal transmission/reception mode 700, receives a backup complete message, as in step 348 of FIG. 3 in step 730, then it performs a turn-off operation and transitions to the transmission/reception off mode 710.

In another exemplary embodiment of the present invention, upon transitioning to the transmission/reception off mode 710, the HZ eNodeB may perform a turn-on operation and transition to the normal transmission/reception mode 700 when a timer expires in step 732.

In exemplary embodiments of the present invention, timer-based steps may be considered and performed in addition to the steps of FIGS. 3 and 4.

With regard to this, when the HZ eNodeB transitions to the transmission/reception off mode 710, it transitions to the normal transmission/reception mode 700 if a preset period of time elapses and a timer expires after the timer is initialized. Subsequently, when traffic load within the cell coverage of the HZ eNodeB is below a threshold value, the HZ eNodeB transitions to the transmission/reception off mode 710 again according to the turn-off operation described above in FIG. 3.

Further, if the HZ eNodeB, which has entered the transmission/reception off mode 710, receives a temporary cell activation request after the timer is initialized and before the timer expires, then it transitions to the transmission/reception off mode 710 or a normal transmission/reception mode 700 according to the turn-on operation described above in FIG. 4.

More specifically, in step 734, when the HZ eNodeB transmits a temporary cell activation response to a macro eNodeB in response to a temporary cell activation request, which has been transmitted by the macro eNodeB, as in step 446 of FIG. 4, while operating in the transmission/reception off mode 710, it transitions to the temporary turn-on mode 720.

Further, in the temporary turn-on mode, the HZ eNodeB performs a temporary turn-on operation, based on time interval information and TX power information included in the temporary cell activation request.

Subsequently, upon receiving a temporary cell deactivation request from the macro eNodeB in step 736, the HZ eNodeB in the temporary turn-on mode 720 performs the turn-off operation and transitions to the transmission/reception off mode 710.

Contrarily, in step 738, upon receiving a cell activation request from the macro eNodeB, as in step 458 of FIG. 4, the HZ eNodeB in the temporary turn-on mode 720 performs the turn-on operation and transitions to the normal transmission/reception mode 700.

Accordingly, through transitions between the above three modes, the HZ eNodeB may advantageously reduce power consumed while satisfying service provision to a UE.

According to the exemplary embodiments of the present invention as described above, in a wireless communication system with a hierarchical cell structure, a lower base station can be turned on or off through communication with an upper base station according to a traffic load within its cell coverage. Therefore a reduction in power consumed in the wireless communication system can be reduced. Further, a wireless communication provider can more economically operate its wireless communication system by reducing operating costs, compared to installation investment costs.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A handover method for a user equipment (UE) in a wireless communication system, the method comprising:
   detecting at least one signal from first base stations (BSs) activated based on a cell activation request of a second BS;
   transmitting to the second BS, a measurement report related to the at least one signal, the measurement report being used for determining a target BS and at least one BS to be deactivated, among the first BSs; and
   performing a handover from the second BS to the target BS,
   wherein the at least one BS to be deactivated enters an energy saving mode based on a cell deactivation request of the second BS.

2. The handover method of claim 1,
   wherein the at least one signal is detected from signals broadcasted by the first BSs activated based on the cell activation request of the second BS, and
   wherein the first BSs and the UE are located in a cell of the second BS.

3. The handover method of claim 1,
   wherein the cell activation request includes a request to perform an activating operation for a preset period, and
   wherein the activating operation comprises an operation to broadcast a reference signal.

4. A method for performing a handover by a first base station (BS) in a wireless communication system, the method comprising:
   transmitting, to second BSs operating in an energy saving mode, a cell activation request;
   receiving, from a user equipment (UE), a measurement report related to at least one signal detected by the UE;
   determining a target BS and at least one BS to be deactivated, among the second BSs based on the measurement report;
   transmitting, to the at least one BS to be deactivated, a cell deactivation request to enter the energy saving mode; and
   performing a handover operation for the UE from the first BS to the target BS.

5. The method of claim 4,
   wherein the at least one signal is detected by the UE from signals broadcasted by the second BSs activated based on the cell activation request, and
   wherein the second BSs and the UE are located in a cell of the first BS.

6. The method of claim 4,
   wherein the cell activation request includes a request to perform an activating operation for a preset period, and
   wherein the activating operation comprises an operation to broadcast a reference signal.

7. A method for performing a handover by a second base station (BS) in a wireless communication system, the method comprising:
   receiving, from a first BS, a cell activation request in an energy saving mode;
   entering a turn on mode based on the cell activation request;
   broadcasting a signal in the turn on mode;
   entering the energy saving mode if a cell deactivation request is received from the first BS; and
   performing, if the second BS is determined as a target BS based on a measurement report related to a signal of a user equipment (UE), a handover operation for the UE from the first BS to the second BS.

8. The method of claim 7,
   wherein the cell activation request comprises a request to perform an activating operation for a preset period, and
   wherein the activating operation comprises an operation to broadcast a reference signal.

9. The method of claim 7,
   wherein the handover operation is performed if the cell activation request is received from the first BS.

10. The method of claim 7, further comprising:
    transmitting a cell deactivation response to the first BS after entering the energy saving mode,
    wherein the second BS and the UE are located in a cell of the first BS.

11. A user equipment (UE) in a wireless communication system, comprising:
    a processor configured to detect at least one signal from first base stations (BSs) activated based on a cell activation request of a second BS; and
    a transceiver configured to transmit to the second BS, a measurement report related to the at least one signal, the measurement report being used for determining a target BS and at least one BS to be deactivated, among the first BSs,
    wherein the processor is further configured to perform a handover from the second BS to the target BS, and
    wherein the at least one BS to be deactivated enters an energy saving mode based on a cell deactivation request of the second BS.

12. The UE of claim 11,
    wherein the at least one signal is detected from signals broadcasted by the first BSs activated based on the cell activation request of the second BS, and wherein the first BSs and the UE are located in a cell of the second BS.

13. The UE of claim 11,
wherein the cell activation request includes a request to perform an activating operation for a preset period, and
wherein the activating operation comprises an operation to broadcast a reference signal.

14. A first base station (BS) in a wireless communication system, comprising:
a transceiver configured to:
   transmit, to second BSs operating in an energy saving mode, a cell activation request, and
   receive, from a user equipment (UE), a measurement report related to at least one signal detected by the UE; and
a processor configured to:
   determine a target BS, and at least one BS to be deactivated, among the second BSs, based on the measurement report,
   control the transceiver for transmitting a cell deactivation request to enter the energy saving mode to the at least one BS to be deactivated, and
   perform a handover operation for the UE from the first BS to the target BS.

15. The first BS of claim 14,
wherein the at least one signal is detected by the UE from signals broadcasted by the second BSs activated based on the cell activation request, and
wherein the second BSs and the UE are located in a cell of the first BS.

16. The first BS of claim 14,
wherein the cell activation request includes a request to perform an activating operation for a preset period, and
wherein the activating operation comprises an operation to broadcast a reference signal.

17. A second base station (BS) in a wireless communication system, comprising:
a transceiver configured to receive, from a first BS, a cell activation request in an energy saving mode; and
a processor configured to:
   enter a turn on mode based on the cell activation request,
   control the transceiver for broadcasting a signal in the turn on mode,
   enter, if a cell deactivation request is received from the first BS, the energy saving mode, and
   perform, if the second BS is determined as a target BS based on a measurement report related to a signal of a user equipment (UE), a handover operation for the UE from the first BS to the second BS.

18. The second BS of claim 17,
wherein the cell activation request comprises a request to perform an activating operation for a preset period, and
wherein the activating operation comprises an operation to broadcast a reference signal.

19. The second BS of claim 17, wherein the handover operation is performed, if a cell activation request is received from the first BS.

20. The second BS of claim 17,
wherein the transceiver is further configured to, transmit, after entering the energy saving mode, a cell deactivation response to the first BS, and
wherein the second BS and the UE are located in a cell of the first BS.

* * * * *